(12) United States Patent
Wang et al.

(10) Patent No.: US 11,942,877 B2
(45) Date of Patent: Mar. 26, 2024

(54) TRIBOELECTRIC GENERATOR, BIOMECHANICAL ENERGY HARVESTER, AND METHOD OF MAKING TRIBOELECTRIC MATERIAL

(71) Applicant: City University of Hong Kong, Kowloon (HK)

(72) Inventors: Lingyun Wang, Kowloon (HK); Walid Daoud, Kowloon (HK)

(73) Assignee: City University of Hong Kong, Kowloon (HK)

(*) Notice: Subject to any disclaimer, the term of this patent is extended or adjusted under 35 U.S.C. 154(b) by 212 days.

(21) Appl. No.: 17/732,636

(22) Filed: Apr. 29, 2022

(65) Prior Publication Data
US 2023/0353067 A1 Nov. 2, 2023

(51) Int. Cl.
H02N 1/04 (2006.01)

(52) U.S. Cl.
CPC ..................... H02N 1/04 (2013.01)

(58) Field of Classification Search
CPC ........................................................ H02N 1/04
USPC ......................................................... 310/310
See application file for complete search history.

(56) References Cited

U.S. PATENT DOCUMENTS

| | | | | |
|---|---|---|---|---|
| 6,545,384 B1* | 4/2003 | Pelrine | ...................... | F02G 1/043 977/788 |
| 11,601,071 B1* | 3/2023 | Yu | .......................... | H02N 1/04 |
| 2015/0061457 A1* | 3/2015 | Sugino | ................... | B81B 3/0021 428/688 |
| 2016/0359429 A1* | 12/2016 | Byun | ....................... | H02N 1/04 |
| 2022/0271686 A1* | 8/2022 | Guiney | .................... | H02N 1/04 |

OTHER PUBLICATIONS

Highly Flexible and Transparent Polyionic-Skin Triboelectric Nanogenerator for Biomechanical Motion Harvesting Lingyun Wang, Walid A. Daoud Wang, L., Daoud, W. A., Adv. Energy Mater. 2019, 9, 1803183. https://doi.org/10.1002/aenm.201803183 (Year: 2019).*
CN 103795288; Wang et al. (Year: 2014).*
Baytekin, H. T.; Patashinski, A. Z.; Branicki, M.; Baytekin, B.; Soh, S.; Grzybowski, B. A. The mosaic of surface charge in contact electrification. Science 2011, 333 (6040), 308-312. https://www.science.org/doi/10.1126/science.1201512.
Apodaca, M. M.; Wesson, P. J.; Bishop, K. J. M.; Ratner, M. A.; Grzybowski, B. A. Contact electrification between dentical materials. Angew. Chem. Int. Ed. 2010, 49 (5), 946-949. https://onlinelibrary.wiley.com/doi/full/10.1002/anie.200905281.

(Continued)

Primary Examiner — Ahmed Elnakib
(74) Attorney, Agent, or Firm — Renner, Kenner, Greive, Bobak, Taylor & Weber

(57) ABSTRACT

A triboelectric generator includes a first triboelectric material providing a first surface, a first electrode attached to the first triboelectric material, a second triboelectric material providing a second surface for contacting the first surface, and a second electrode attached to the second triboelectric material. The second triboelectric material is different from the first triboelectric material. The first electrode and the second electrode are arranged to be electrically connected via an electrical connection. The first triboelectric material comprises a polymer material and an organic semiconductor material arranged in the polymer material.

20 Claims, 14 Drawing Sheets

(56) References Cited

OTHER PUBLICATIONS

Horn, R. G.; Smith, D. T. Contact electrification and adhesion between dissimilar materials. Science 1992, 256 (5055), 362-364. https://www.science.org/doi/10.1126/science.256.5055.362.
Fan, F. R.; Tian, Z. Q.; Wang, Z. L. Flexible triboelectric generator! Nano Energy 2012, 1 (2), 328-334. https://www.sciencedirect.com/science/article/pii/S2211285512000481.
Wang, Z. L. Triboelectric nanogenerators as new energy technology and self-powered sensors—Principles, problems and perspectives. Faraday Discuss. 2014, 176, 447-458. https://pubs.rsc.org/en/content/articlelanding/2014/fd/c4fd00159a.
Zi, Y. L.; Guo, H. Y.; Wen, Z.; Yeh, M. H.; Hu, C. G.; Wang, Z. L. Harvesting low-frequency (< 5 Hz) irregular mechanical energy: A possible killer application of triboelectric nanogenerator. ACS Nano 2016, 10 (4), 4797-4805. https://pubs.acs.org/doi/10.1021/acsnano.6b01569.
Hinchet, R.; Yoon, H. J.; Ryu, H.; Kim, M. K.; Choi, E. K.; Kim, D. S.; Kim, S. W. Transcutaneous ultrasound energy harvesting using capacitive triboelectric technology. Science 2019, 365 (6452), 491-494. https://www.nature.com/articles/s41467-020-19059-3.
Jin, T.; Sun, Z. D.; Li, L.; Zhang, Q.; Zhu, M. L.; Zhang, Z. X.; Yuan, G. J.; Chen, T.; Tian, Y. Z.; Hou, X. Y.; et al. Triboelectric nanogenerator sensors for soft robotics aiming at digital twin applications. Nat. Commun. 2020, 11 (1), 5381. https://www.nature.com/articles/s41467-020-19059-3.
Wang, L. Y.; Bian, Y.; Lim, C. K.; Niu, Z. L.; Lee, P. K. H.; Chen, C.; Zhang, L.; Daoud, W. A.; Zi, Y. L. Tribo-charge enhanced hybrid air filter masks for efficient particulate matter capture with greatly extended service life. Nano Energy 2021, 85, 106015. https://www.sciencedirect.com/science/article/pii/S2211285521002731.
Wang, Z. L. On the first principle theory of nanogenerators from Maxwell's equations. Nano Energy 2020, 68, 104272. https://www.sciencedirect.com/science/article/pii/S2211285519309796.
Wang, Z. L.; Wang, A. C. On the origin of contact-electrification. Mater. Today 2019, 30, 34-51. https://www.sciencedirect.com/science/article/pii/S1369702119303700.
Izadi, H.; Penlidis, A. Polymeric bio-inspired dry adhesives: Van der Waals or electrostatic interactions? Macromol. React. Eng. 2013, 7 (11), 588-608. https://onlinelibrary.wiley.com/doi/10.1002/mren.201300146.
Izadi, H.; Stewart, K. M. E.; Penlidis, A. Role of contact electrification and electrostatic interactions in gecko adhesion. J. R. Soc. Interface 2014, 11 (98), 0371. https://royalsocietypublishing.org/doi/full/10.1098/rsif.2014.0371.
Wang, J.; Wu, C. S.; Dai, Y. J.; Zhao, Z. H.; Wang, A.; Zhang, T. J.; Wang, Z. L. Achieving ultrahigh triboelectric charge density for efficient energy harvesting. Nat. Commun. 2017, 8, 88. https://www.nature.com/articles/s41467-017-00131-4.
Wang, H. M.; Xu, L.; Bai, Y.; Wang, Z. L. Pumping up the charge density of a triboelectric nanogenerator by charge-shuttling. Nat. Commun. 2020, 11 (1), 4203. https://www.nature.com/articles/s41467-020-17891-1.
Xu, L.; Bu, T. Z.; Yang, X. D.; Zhang, C.; Wang, Z. L. Ultrahigh charge density realized by charge pumping at ambient conditions for triboelectric nanogenerators. Nano Energy 2018, 49, 625-633. https://www.sciencedirect.com/science/article/pii/S2211285518303264.
Liu, W. L.; Wang, Z.; Wang, G.; Liu, G. L.; Chen, J.; Pu, X. J.; Xi, Y.; Wang, X.; Guo, H. Y.; Hu, C. G.; et al. Integrated charge excitation triboelectric nanogenerator. Nat. Commun. 2019, 10, 1426. https://www.nature.com/articles/s41467-019-09464-8.
Liu, Y. K.; Liu, W. L.; Wang, Z.; He, W. C.; Tang, Q.; Xi, Y.; Wang, X.; Guo, H. Y.; Hu, C. G. Quantifying contact status and the air-breakdown model of charge-excitation triboelectric nanogenerators to maximize charge density. Nat. Commun. 2020, 11 (1), 1599. https://www.nature.com/articles/s41467-020-15368-9.
Lapčinskis, L.; Mālnieks, K.; Blūms, J.; Knite, M.; Oras, S.; Kääambre, T.; Vlassov, S.; Antsov, M.; Timusk, M.; Sutka, A. The adhesion-enhanced contact electrification and efficiency of triboelectric nanogenerators. Macromol. Mater. Eng. 2020, 305 (1), 1900638. https://onlinelibrary.wiley.com/doi/full/10.1002/mame.201900638.
Sutka, A.; Malnieks, K.; Lapcinskis, L.; Kaufelde, P.; Linarts, A.; Berzina, A.; Zabels, R.; Jurkans, V.; Gornevs, I.; Blums, J.; et al. The role of intermolecular forces in contact electrification on polymer surfaces and triboelectric hanogenerators. Energy Environ. Sci. 2019, 12 (8), 2417. https://pubs.rsc.org/en/content/articlelanding/2019/ee/c9ee01078e.
Persson, B. N. J.; Scaraggi, M. Theory of adhesion: Role of surface roughness. J. Chem. Phys. 2014, 141 (12), 124701. https://aip.scitation.org/doi/10.1063/1.4895789.
Pandey, R. K.; Kakehashi, H.; Nakanishi, H.; Soh, S. Correlating material transfer and charge transfer in contact electrification. J. Phys. Chem. C 2018, 122 (28), 16154-16160. https://pubs.acs.org/doi/10.1021/acs.jpcc.8b04357.
Zhang, J. Y.; Ferrie, S.; Zhang, S.; Vogel, Y. B.; Peiris, C. R.; Darwish, N.; Ciampi, S. Single-electrode electrochemistry: Chemically engineering surface adhesion and hardness to maximize redox work extracted from tribocharged silicon. ACS Appl. Nano Mater. 2019, 2 (11), 7230-7236. https://pubs.acs.org/doi/full/10.1021/acsanm.9b01726.
Gong, J. L.; Xu, B. G.; Yang, Y. J.; Wu, M. J.; Yang, B. An adhesive surface enables high-performance mechanical energy harvesting with unique frequency-insensitive and pressure-enhanced output characteristics. Adv. Mater. 2020, 32 (14), 1907948. https://onlinelibrary.wiley.com/doi/full/10.1002/adma.201907948.
Xu, G. Q.; Li, X. Y.; Xia, X.; Fu, J. J.; Ding, W. B.; Zi, Y. L. On the force and energy conversion in triboelectric nanogenerators. Nano Energy 2019, 59, 154-161. https://www.sciencedirect.com/science/article/pii/S2211285519301491.
Yamada, S.; Toshiyoshi, H. A water dissolvable electrolyte with an ionic liquid for eco-friendly electronics. Small 2018, 14 (32), 1800937. https://onlinelibrary.wiley.com/doi/full/10.1002/smll.201800937.
Cai, G. F.; Wang, J. X.; Qian, K.; Chen, J. W.; Li, S. H.; Lee, P. S. Extremely stretchable strain sensors based on conductive self-Healing dynamic cross-links hydrogels for human-motion detection. Adv Sci 2017, 4 (2), 1600190. https://onlinelibrary.wiley.com/doi/10.1002/advs.201600190.
Liang, J. J.; Huang, Y.; Zhang, L.; Wang, Y.; Ma, Y. F.; Guo, T. Y.; Chen, Y. S. Molecular-level dispersion of graphene into poly(vinyl alcohol) and effective reinforcement of their nanocomposites. Adv. Funct. Mater. 2009, 19 (14), 2297-2302. https://onlinelibrary.wiley.com/doi/10.1002/adfm.200801776.
Yang, F.; Li, J.; Long, Y.; Zhang, Z. Y.; Wang, L. F.; Sui, J. J.; Dong, Y. T.; Wang, Y. Z.; Taylor, R.; Ni, D. L.; et al. Wafer-scale heterostructured piezoelectric bio-organic thin films. Science 2021, 373 (6552), 337-342. https://www.science.org/doi/10.1126/science.abf2155.
Wang, L. Y.; Daoud, W. A. Highly flexible and transparent polyionic-skin triboelectric nanogenerator for biomechanical motion harvesting. Adv. Energy Mater. 2019, 9 (5), 1803183. https://onlinelibrary.wiley.com/doi/full/10.1002/aenm.201803183.
Wang, L. Y.; Liu, Y. M.; Liu, Q.; Zhu, Y. Y.; Wang, H. Y.; Xie, Z. Q.; Yu, X. G.; Zi, Y. L. A metal-electrode-free, fully integrated, soft triboelectric sensor array for self-powered tactile sensing. Microsyst. Nanoeng. 2020, 6 (1), 59. https://www.nature.com/articles/s41378-020-0154-2.
Wang, R. X.; Mu, L. W.; Bao, Y. K.; Lin, H.; Ji, T.; Shi, Y. J.; Zhu, J. H.; Wu, W. Z. Holistically engineered polymer-polymer and polymer-ion interactions in biocompatible polyvinyl alcohol blends for high-performance triboelectric devices in self-powered wearable cardiovascular monitorings. Adv. Mater. 2020, 32 (32), 2002878. https://onlinelibrary.wiley.com/doi/full/10.1002/adma.202002878.
Bhattacharya, A.; Ray, P. Studies on surface tension of poly(vinyl alcohol): Effect of concentration, temperature, and addition of chaotropic agents. J. Appl. Polym. Sci. 2004, 93 (1), 122-130. https://onlinelibrary.wiley.com/doi/full/10.1002/app.20436.
Flory, P. J. Principles of Polymer Chemistry; Cornell University Press: New York, 1953. https://link.springer.com/book/10.1007/978-1-4614-2212-9.

(56) References Cited

OTHER PUBLICATIONS

Lee, W. H.; Park, Y. D. Organic semiconductor/insulator polymer blends for high-performance organic transistors. Polymers-Basel 2014, 6 (4), 1057-1073. https://www.mdpi.com/2073-4360/6/4/1057.

Oh, W.; Bae, J. S.; Park, J. W. The Interplay between Phase Separation and Gelation Controlling the Morphologies of the Reactive Covalent Network/Polymer Blends. Macromolecules 2021, 54 (3), 1192-1202. https://pubs.acs.org/doi/10.1021/acs.macromol.0c02520.

Zhang, Y. F.; Su, Y.; Wu, H. W.; Wang, Z. H.; Wang, C.; Zheng, Y.; Zheng, X.; Gao, L.; Zhou, Q.; Yang, Y.; et al. Large-area, flexible, transparent, and long-lived polymer-based phosphorescence films. J. Am. Chem. Soc. 2021, 143 (34), 13675-13685. https://pubs.acs.org/doi/10.1021/jacs.1c05213.

Gabryelczyk, B.; Cai, H.; Shi, X. Y.; Sun, Y.; Swinkels, P. J. M.; Salentinig, S.; Pervushin, K.; Miserez, A. Hydrogen bond guidance and aromatic stacking drive liquid-liquid phase separation of intrinsically disordered histidine-rich peptides. Nat. Commun. 2019, 10, 5465. https://www.nature.com/articles/s41467-019-13469-8.

Croll, A. B.; Hosseini, N.; Bartlett, M. D. Switchable Adhesives for Multifunctional Interfaces. Adv. Mater. Technol. 2019, 4 (8), 1900193. https://onlinelibrary.wiley.com/doi/full/10.1002/admt.201900193.

Kanduc, M.; Netz, R. R. From hydration repulsion to dry adhesion between asymmetric hydrophilic and hydrophobic surfaces. Proc. Nat. Acad. Sci. U.S.A. 2015, 112 (40), 12338-12343. https://www.pnas.org/doi/10.1073/pnas.1504919112.

Le Questel, J.- Y.; Berthelot, M.; Laurence, C. Hydrogen-bond acceptor properties of nitriles: a combined crystallographic and ab initio theoretical investigation. J. Phys. Org. Chem. 2000, 13 (6), 347-358. https://onlinelibrary.wiley.com/doi/10.1002/1099-1395%28200006%2913%3A6%3C347%3A%3AAID-POC251%3E3.0.CO%3B2-E.

Shimomura, S.; Higuchi, M.; Matsuda, R.; Yoneda, K.; Hijikata, Y.; Kubota, Y.; Mita, Y.; Kim, J.; Takata, M.; Kitagawa, S. Selective sorption of oxygen and nitric oxide by an electron-donating flexible porous coordination polymer. Nat. Chem. 2010, 2 (8), 633-637. https://www.nature.com/articles/nchem.684.

Qiao, B.; Zhao, X. Y.; Yue, D. M.; Zhang, L. Q.; Wu, S. Z. A combined experiment and molecular dynamics simulation study of hydrogen bonds and free volume in nitrile-butadiene rubber/hindered phenol damping mixtures. J. Mater. Chem. 2012, 22 (24), 12339-12348. https://pubs.rsc.org/en/content/articlelanding/2012/jm/c2jm31716h.

Cheong, J. Y.; Koay, J. S. C.; Chen, R. H.; Aw, K. C.; Velayutham, T. S.; Chen, B. H.; Li, J.; Foo, C. Y.; Gan, W. C. Maximizing the output power density enhancement of solid polymer electrolyte based-triboelectric nanogenerators via contact electrification-induced ionic polarization. Nano Energy 2021, 90, 106616. https://www.sciencedirect.com/science/article/pii/S2211285521008673.

Uzabakiriho, P. C.; Haider, Z.; Emmanuel, K.; Ahmad, R. U. S.; Haleem, A.; Farooq, U.; Uwisengeyimana, J. D.; Mbogba, M. K.; Fareed, A.; Memon, K.; et al. High-performance, mechanically and thermally compliant silica-based solid polymer electrolyte for triboelectric nanogenerators application. Adv. Mater. Technol. 2020, 5 (7), 2000303. https://onlinelibrary.wiley.com/doi/full/10.1002/admt.202000303.

Ryu, H.; Lee, J. H.; Kim, T. Y.; Khan, U.; Lee, J. H.; Kwak, S. S.; Yoon, H. J.; Kim, S. W. High-performance triboelectric hanogenerators based on solid polymer electrolytes with asymmetric pairing of ions. Adv. Energy Mater. 2017, 7 (17), 1700289. https://onlinelibrary.wiley.com/doi/full/10.1002/aenm.201700289.

Du, W. Q.; Nie, J.; Ren, Z. H.; Jiang, T. W.; Xu, L.; Dong, S. J.; Zheng, L.; Chen, X. Y.; Li, H. X. Inflammation-free and gas-permeable on-skin triboelectric nanogenerator using soluble nanofibers. Nano Energy 2018, 51, 260-269. https://www.sciencedirect.com/science/article/pii/S2211285518304221.

Dudem, B.; Graham, S. A.; Dharmasena, R. D. I. G.; Silva, S. R. P.; Yu, J. S. Natural silk-composite enabled versatile robust triboelectric nanogenerators for smart applications. Nano Energy 2021, 83, 105819. https://www.sciencedirect.com/science/article/pii/S221128552100077X.

Wu, J. P.; Liang, W.; Song, W. Z.; Zhou, L. N.; Wang, X. X.; Ramakrishna, S.; Long, Y. Z. An acid and alkali-resistant triboelectric nanogenerator. Nanoscale 2020, 12 (45), 23225-23233. https://onlinelibrary.wiley.com/doi/full/10.1002/adfm.202102963.

Jiang, C. M.; Wu, C.; Li, X. J.; Yao, Y.; Lan, L. Y.; Zhao, F. N.; Ye, Z. Z.; Ying, Y. B.; Ping, J. F. All-electrospun flexible triboelectric nanogenerator based on metallic MXene nanosheets. Nano Energy 2019, 59, 268-276. https://www.sciencedirect.com/science/article/pii/S221128551930165X.

Wang, L. Y.; Yang, X. Y.; Daoud, W. A. High power-output mechanical energy harvester based on flexible and transparent Au nanoparticle-embedded polymer matrix. Nano Energy 2019, 55, 433-440. https://www.sciencedirect.com/science/article/pii/S2211285518307493.

Graham, S. A.; Dudem, B.; Mule, A. R.; Patnam, H.; Yu, J. S. Engineering squandered cotton into eco-benign microarchitected triboelectric films for sustainable and highly efficient mechanical energy harvesting. Nano Energy 2019, 61, 505-516. https://www.sciencedirect.com/science/article/pii/S2211285519303829.

Shi, L.; Dong, S. R.; Xu, H. S.; Huang, S. Y.; Ye, Q. K.; Liu, S. T.; Wu, T.; Chen, J. K.; Zhang, S. M.; Li, S. J.; et al. Enhanced performance triboelectric nanogenerators based on solid polymer electrolytes with different concentrations of cations. Nano Energy 2019, 64, 103960. https://www.sciencedirect.com/science/article/pii/S2211285519306676.

\* cited by examiner

TRIBOELECTRIC GENERATOR, BIOMECHANICAL ENERGY HARVESTER, AND METHOD OF MAKING TRIBOELECTRIC MATERIAL

TECHNICAL FIELD

The invention relates to a triboelectric generator, a biomechanical energy harvester, and a method of making a triboelectric material for use in a triboelectric generator.

BACKGROUND

Triboelectric generators generally refer to devices and systems arranged to generate voltage and/or current based on a triboelectric effect. These generators can be used in energy harvesting applications, e.g., as power sources, or in self-powered systems, for converting low-frequency ambient mechanical energy into electricity by the coupling of contact electrification and electrostatic induction.

SUMMARY OF THE INVENTION

In a first aspect there is provided a triboelectric generator, or triboelectric nanogenerator, comprising: a first triboelectric material providing a first surface, a first electrode attached to the first triboelectric material, a second triboelectric material providing a second surface for contacting the first surface, and a second electrode attached to the second triboelectric material. The second triboelectric material is different from the first triboelectric material. The first electrode and the second electrode are arranged to be electrically connected via an electrical connection. The electrical connection provides an electron flow path. The first triboelectric material, and more specifically the first surface, comprises a polymer material and an organic semiconductor material arranged in the polymer material. The triboelectric generator can (but need not) include one or more further triboelectric material(s). The first triboelectric material and the second triboelectric material have different rankings in the triboelectric series, i.e., with different tendencies to gain or lose electrons. The polymer material can be polymer with abundant —OH groups and the organic semiconductor material can be any organic semiconductor material, provided that the following criteria are met: (1) the polymer material (or polymer matrix) has a different solubility than the organic semiconductor material (which may facilitate phase change during solvent evaporation); (2) one of the polymer material and the organic semiconductor material acts as a hydrogen bonding donor, another acts as a hydrogen bonding acceptor (which may provide desired intermolecular interactions); and (3) the organic semiconductor material, in the form of semiconductor molecules, has coplanar structure, pi-pi stacking, and C≡N functional group (which may facilitate formation of surface topography after phase separation).

The first triboelectric material may be arranged in a layer, e.g., a film, which may be generally flat. An average thickness of the layer may be in the order of tens, hundreds, or thousands of μm. A surface area of the layer may be in the order of $cm^2$. The second triboelectric material may be arranged in a layer, e.g., a film, which may be generally flat. An average thickness of the layer may be in the order of tens, hundreds, or thousands of μm. A surface area of the layer may be in the order of $cm^2$. The first triboelectric material and the second triboelectric material may or may not have the same shape and/or size (thickness, width and/or length).

Optionally, the organic semiconductor material comprises 7,7,8,8-tetracyanoquinodimethane (TCNQ). Optionally, the organic semiconductor material consists essentially of or consists of 7,7,8,8-tetracyanoquinodimethane (TCNQ).

Optionally, the polymer material comprises polyvinyl alcohol (PVA). Optionally, the polymer material consists essentially of or consists of polyvinyl alcohol (PVA).

Optionally, the first triboelectric material comprises a TCNQ-PVA material and the first surface comprises a TCNQ-modified PVA surface. Optionally, the first triboelectric material consists essentially of or consists of a TCNQ-PVA material and the first surface consists essentially of or consists of a TCNQ-modified PVA surface. The TCNQ-modified PVA surface is a patterned or roughened surface, with a nano or/micro-meter scale surface roughness. The TCNQ-modified PVA surface may have a convex pattern topography.

Optionally, the first surface and the second surface define a substantially non-adhesion interface. The substantially non-adhesion interface provides no or negligible attraction force (that acts against or prevents separation of the first and second surfaces) when the first and second surfaces are in contact.

Optionally, the second triboelectric material comprises a tribo-negative material. Optionally, the second triboelectric material consists of or consists essentially of a tribo-negative material.

Optionally, the second triboelectric material comprises silicone rubber. Optionally, the second triboelectric material consists of or consists essentially of silicone rubber.

Optionally, the TCNQ-PVA material comprises a TCNQ-PVA blend film. Optionally, the TCNQ-PVA material is formed by: facilitating phase separation (e.g., by film-casting, spin-coating, etc.) of a TCNQ-PVA solution containing 0.25 w/v % to 1 w/v % TCNQ.

Optionally, the TCNQ-PVA material is formed by: facilitating phase separation (e.g., by film-casting, spin-coating, etc.) of a TCNQ-PVA solution containing 0.5 w/v % to 1 w/v %, 0.5 w/v % to 0.75 w/v %, or 0.75 w/v % to 1 w/v % TCNQ.

Optionally, the TCNQ-PVA material is formed by: facilitating phase separation (e.g., by film-casting, spin-coating, etc.) of a TCNQ-PVA solution containing about 0.5 w/v %, about 0.75 w/v %, or about 1 w/v % of TCNQ.

Optionally, the triboelectric generator further comprises the electrical connection.

The first electrode may be attached to the first triboelectric material at any surface other than the first surface. The second electrode may be attached to the second triboelectric material at any surface other than the second surface. In one example, the first electrode is attached to the first triboelectric material at a surface opposite to the first surface. In one example, the second electrode is attached to the second triboelectric material at a surface opposite to the second surface. The first electrode may be attached directly to the first triboelectric material. The second electrode may be attached directly to the second triboelectric material.

The first electrode may be arranged in a layer, e.g., a film, which may be generally flat. An average thickness of the layer may be in the order of tens, hundreds, or thousands of μm. A surface area of the layer may be in the order of $cm^2$. The second electrode may be arranged in a layer, e.g., a film, which may be generally flat. An average thickness of the layer may be in the order of tens, hundreds, or thousands of μm. A surface area of the layer may be in the order of $cm^2$. The first electrode and the second electrode may or may not have the same shape and/or size (thickness, width and/or length). The first electrode and the second electrode may or may not be made of the same material(s).

Optionally, one or both of the first electrode and the second electrode are made of metal or metal alloy. Optionally, one or both of the first electrode and the second electrode are made of Ni/Ag, e.g., Ni/Ag tape.

Optionally, one or both of the first electrode and the second electrode are double-sided conductive.

Optionally, the triboelectric generator further comprises: a first substrate attached to the first electrode such that the first electrode is disposed between the first substrate and the first triboelectric material; and a second substrate attached to the second electrode such that the second electrode is disposed between the second substrate and the second triboelectric material.

The first substrate may be attached to the first electrode at any surface of the first electrode other than the surface in contact with the first triboelectric material. The second substrate may be attached to the second electrode at any surface of the second electrode other than the surface in contact with the second triboelectric material. In one example, the first substrate is attached to the first electrode at a surface opposite to the surface in contact with the first triboelectric material. In one example, the second substrate is attached to the second electrode at a surface opposite to the surface in contact with the second triboelectric material. The first substrate may be attached directly to the first electrode. The second substrate may be attached directly to the second electrode.

The first substrate may be arranged in a layer, e.g., a film, which may be generally flat. An average thickness of the layer may be in the order of tens, hundreds, or thousands of μm. A surface area of the layer may be in the order of $cm^2$. The second substrate may be arranged in a layer, e.g., a film, which may be generally flat. An average thickness of the layer may be in the order of tens, hundreds, or thousands of μm. A surface area of the layer may be in the order of $cm^2$. The first substrate and the second substrate may or may not have the same shape and/or size (thickness, width and/or length). The first substrate and the second substrate may or may not be made of the same material(s).

Optionally, one or both of the first substrate and the second substrate are made of polyethylene terephthalate (PET).

The first triboelectric material, the first electrode, and the first substrate may be arranged as stacked layers. The stacked layers may be rigid, flexible, or resilient. The second triboelectric material, the second electrode, and the second substrate may be arranged as stacked layers. The stacked layers may be rigid, flexible, or resilient.

Optionally, the triboelectric generator further comprises: a mechanism configured to bias at least one of the first surface and the second surface such that the first surface and the second surface are separated from each other. The mechanism may include a mechanical mechanism (e.g., actuator, motor, spring), a magnetic mechanism (e.g., magnets), an electromagnetic mechanism (e.g., electromagnets), etc. The mechanism may act on the first surface, the second surface, or both to bias them into separation. Force may be applied to overcome the bias provided by the mechanism to move the first surface and/or the second surface so that the first surface contacts the second surface.

Optionally, the triboelectric generator further comprises: a mechanism configured to bias at least one of the first surface and the second surface such that the first surface and the second surface are in contact. The mechanism may include a mechanical mechanism (e.g., actuator, motor, spring), a magnetic mechanism (e.g., magnets), an electromagnetic mechanism (e.g., electromagnets), etc. The mechanism may act on the first surface, the second surface, or both to bias them into contact. Force may be applied to overcome the bias provided by the mechanism to move the first surface and/or the second surface so that the first surface separates from the second surface.

Optionally, the triboelectric generator further comprises: a mechanism configured to cause relative motion of the first surface and the second surface along a direction substantially perpendicular to the first surface and/or the second surface. Optionally the mechanism may cause consecutive contact and separation of the first and second surfaces. The mechanism may include a mechanical mechanism (e.g., actuator, motor), an electromagnetic mechanism (e.g., electromagnets), etc.

Optionally, the triboelectric generator does not include any mechanism configured to cause relative motion of the first surface and the second surface. The relative motion of the first surface and the second surface may be caused by manipulation of the user (e.g., human).

Optionally, the triboelectric generator is a contact-separation triboelectric generator. Optionally, the triboelectric generator is operable in other modes.

Optionally, the triboelectric generator is a flexible or resilient triboelectric generator.

In a second aspect there is provided a method of making a triboelectric material for a triboelectric generator. The triboelectric generator may or may not be the triboelectric generator of the first aspect. The method comprises: obtaining a solution of an organic semiconductor material and a polymer material; and facilitating phase separation of the solution, in particular phase separation of the organic semiconductor material and the polymer material, to obtain an organic semiconductor material—polymer material blend film. The organic semiconductor material—polymer material blend film is the triboelectric material.

In the second aspect, the polymer material can be polymer with abundant —OH groups and the organic semiconductor material can be any organic semiconductor material, provided that the following criteria are met: (1) the polymer material (or polymer matrix) has a different solubility than the organic semiconductor material (which may facilitate phase change during solvent evaporation); (2) one of the polymer material and the organic semiconductor material acts as a hydrogen bonding donor, another acts as a hydrogen bonding acceptor (which may provide desired intermolecular interactions); and (3) the organic semiconductor material, in the form of semiconductor molecules, has coplanar structure, pi-pi stacking, and C≡N functional group (which may facilitate formation of surface topography after phase separation).

Optionally, the phase separation of the solution is facilitated by at least a film casting process or a spin-coating process.

Optionally, the solution is a TCNQ-PVA solution, the blend film is a TCNQ-PVA blend film, and the TCNQ-PVA blend film is arranged to provide a tribo-positive surface.

Optionally, the TCNQ-PVA solution contains 0.25 w/v % to 1 w/v % TCNQ, 0.5 w/v % to 1 w/v %, 0.5 w/v % to 0.75 w/v %, or 0.75 w/v % to 1 w/v % TCNQ.

Optionally, the TCNQ-PVA solution contains about 0.5 w/v %, about 0.75 w/v %, or about 1 w/v % of TCNQ.

Optionally, obtaining the TCNQ-PVA solution comprises: mixing TCNQ with a PVA solution to obtain a homogeneous solution with a single mixed phase in solution form. The PVA solution may be a 10 w/v % PVA solution. The mixing may include stirring and/or heating the TCNQ and PVA solution. The heating temperature may be about 80° C. or above 80° C.

Optionally, obtaining the TCNQ-PVA solution further comprises: mixing PVA with water to obtain the PVA solution. The water may be deionized water. The PVA solution may be a 10 w/v % PVA solution. The mixing may include stirring and/or heating. The heating temperature may be about 80° C. or above 80° C.

Optionally, the phase separation of the solution is facilitated by film-casting and the film-casting comprises: casting the TCNQ-PVA solution; and drying the TCNQ-PVA solution to form a TCNQ-PVA blend film. Casting the TCNQ-PVA solution may include placing the TCNQ-PVA solution in a container, such as a petri-dish. Drying the TCNQ-PVA solution may include air-drying the TCNQ-PVA solution, e.g., at room temperature and pressure, and preferably at a certain water evaporation rate. In one example, the air-drying is performed under a fume hood operating with a face velocity or ventilation rate 0.35 m/s. In one example, the drying process can be speeded up by moderately-low-temperature heating, such as at 60° C. or below.

Optionally, the method further comprises removing the TCNQ-PVA blend film from the container.

Optionally, the method further comprises cutting the TCNQ-PVA blend film into a size suitable for an intended application.

In a third aspect there is provided a triboelectric generator including a triboelectric material made using the method of the second aspect. The triboelectric generator may or may not be the triboelectric generator of the first aspect.

In a fourth aspect there is provided a biomechanical energy harvester comprising the triboelectric generator of the first aspect or the third aspect. The biomechanical energy harvester is configured to harvest motion (e.g., walking, jogging, running, exercising) of a user (e.g., animal or human) for generation of electricity. The biomechanical energy harvester may be a wearable device.

In a fifth aspect, there is provided an electrical device comprising: a load; and a triboelectric generator operably coupled with the load to power the load. The triboelectric generator is the triboelectric generator of the first aspect or the third aspect.

The load may include one or more light-emitting diodes (LEDs), electronic device (e.g., electronic watch, timer, etc.), sensor (e.g., biomedical sensor), etc. The electrical device may be a wearable device. The triboelectric generator may be the only power source of the electrical device.

Optionally, the electrical device further comprises a wireless power transfer circuit electrically connected with triboelectric generator and the load to enable wireless power transfer from the triboelectric generator to the load.

Optionally, the electrical device further comprises an electrical circuit electrically connected between the triboelectric generator and the load to enable wired power transfer from the triboelectric generator to the load.

Other features and aspects of the invention will become apparent by consideration of the detailed description and accompanying drawings. Any feature(s) described herein in relation to one aspect or embodiment may be combined with any other feature(s) described herein in relation to any other aspect or embodiment as appropriate and applicable.

Terms of degree such that "generally", "about", "substantially", or the like, are, depending on context, used to take into account manufacture tolerance, degradation, trend, tendency, practical applications, etc.

BRIEF DESCRIPTION OF THE DRAWINGS

Embodiments of the invention will now be described, by way of example, with reference to the accompanying drawings in which.

DETAILED DESCRIPTION

The inventors of the present invention have devised, through research, experiments, and trials, that surface charge density, surface morphology/topology, dielectric property, etc. of triboelectric materials can affect the power output and stability of triboelectric generators. The inventors of the present invention have also devised, through research, experiments, and trials, that triboelectric generators with adhesion interfaces (between different triboelectric materials) tend to generate more surface charges than non-adhesion interfaces (between different triboelectric materials), but the adhesion interfaces require more energy than non-adhesion interfaces for separation. The inventors of the present invention have realized that the optimization of adhesion of the interface and surface charge density is an engineering problem that needs to be addressed.

Figure 1:
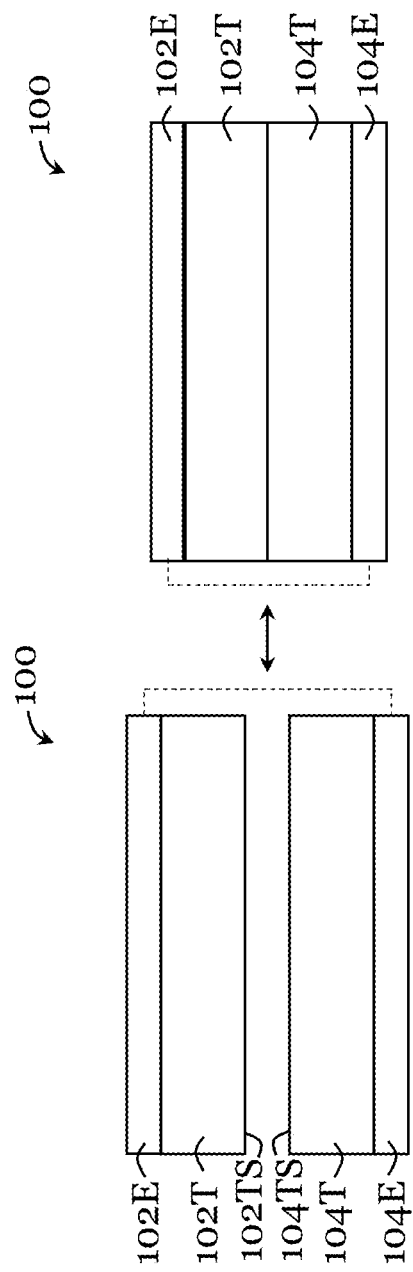
FIG. 1 is a schematic diagram of a triboelectric generator in one embodiment of the invention.

FIG. 1 schematically shows a triboelectric generator 100 in one embodiment of the invention. The triboelectric generator 100 is operable in at least a contact-separation mode (also referred to as "vertical contact-separation mode"). The triboelectric generator 100 includes a first triboelectric material layer 102T and a second triboelectric material layer 104T, which are made of different materials, i.e., materials with different rankings in the triboelectric series, or with different tendencies to gain or lose electrons. At least one of the first triboelectric material layer 102T and the second triboelectric material layer 104T is a dielectric material. A surface 102TS of the first triboelectric material layer 102T and a surface 104TS of the second triboelectric material layer 104T are arranged in facing relationship. The surfaces 102TS, 104TS are arranged to contact with and separate from each other to generate surface charges by virtue of the contact electrification. The surfaces 102TS, 104TS define a charge or electron transfer interface.

The triboelectric generator 100 also includes a first electrode layer 102E is attached to the first triboelectric material layer 102T at a surface opposite to the surface 102TS, and a second electrode layer 104E attached to the second triboelectric material layer 104T at a surface opposite to the surface 104TS. The first electrode layer 102E and the second electrode layer 104E are arranged to be electrically connected via an electrical connection that provides an electron flow path. The electrical connection may have one or more electrical components (e.g., resistive, capacitive components). The first and second electrode layers 102E, 104E induce charges from the surfaces 102TS, 104TS by virtue of electrostatic induction. The potential difference between the first and second electrode layers 102E, 104E, generated as the surfaces 102TS, 104TS contact with and separate from each other, can drive charges (electrons) to flow through the electrical connection. The first electrode layer 102E and the second electrode layer 104E are made of metal or metal alloy, such as Ni/Ag, which may be in the form of a tape conductive on both sides.

The first triboelectric material layer 102T, and in particular the first surface 102TS, is formed by a polymer material and an organic semiconductor material arranged in the polymer material. Without wishing to be bound by theory, the polymer material can be polymer with abundant —OH groups and the organic semiconductor material can be any organic semiconductor material, provided that the following criteria are met: (1) the polymer material (or polymer matrix) has a different solubility than the organic semiconductor material (which facilitates phase change during solvent evaporation); (2) one of the polymer material and the organic semiconductor material acts as a hydrogen bonding donor, another acts as a hydrogen bonding acceptor (desired intermolecular interactions); and (3) the organic semiconductor material, in the form of semiconductor molecules, has coplanar structure, pi-pi stacking, and C≡N functional group (which facilitates formation of surface topography after phase separation).

In some embodiments, the polymer material is polyvinyl alcohol (PVA). The molecular weight of the PVA may be between 10,000 and 300,000, or between 60,000 and 200,000, although other values or ranges are also contemplated. In some embodiments, the organic semiconductor material is 7,7,8,8-tetracyanoquinodimethane (TCNQ). In some embodiments, the first triboelectric material layer 102T is a TCNQ-PVA material, e.g., a TCNQ-PVA blend film, and the first surface 102TS is a TCNQ-modified PVA surface, which is patterned or rough (e.g., nano or/micro meter scale surface roughness). The TCNQ-PVA material may have an uneven distribution of TCNQ, with a first phase, which includes the surface 102TS, having a higher concentration of TCNQ than a second phase. The TCNQ-PVA material or blend film can be formed by facilitating phase separation (e.g., by film-casting, spin-coating, etc.) of a TCNQ-PVA solution containing 0.25 w/v % to 1 w/v %, 0.5 w/v % to 1 w/v %, 0.5 w/v % to 0.75 w/v %, 0.75 w/v % to 1 w/v %, about 0.5 w/v %, about 0.75 w/v %, or about 1 w/v % of TCNQ. Details of a film-casting operation in some embodiments of the invention is provided below.

In some embodiments, the TCNQ-PVA material or TCNQ-PVA blend film may be made by: obtaining a TCNQ-PVA solution containing X w/v % TCNQ and facilitating phase separation (e.g., by film-casting, spin-coating, etc.) the TCNQ-PVA solution to obtain a TCNQ-PVA blend film, where X may be between 0.25-0.1, 0.5-0.1, 0.75-0.1, 0.5-

0.75, about 0.75, about 1, or about 0.5. The TCNQ-PVA solution may be obtained by mixing TCNQ with a PVA solution (in accordance with the w/v %), preferably with stirring and/or heating, to obtain a homogeneous solution with a single mixed phase in solution form. the TCNQ and PVA solution. The PVA solution may be obtained by mixing PVA and water such as deionized water, preferably with stirring and/or heating. The mixing of PVA and water and the mixing of the TCNQ to the PVA solution can be performed as a one-step solution fabrication process.

In some embodiments, the film-casting operation may include casting the TCNQ-PVA solution, e.g., placing the TCNQ-PVA solution in a container; and then drying, e.g., air-drying, the TCNQ-PVA solution to form a TCNQ-PVA material or TCNQ-PVA blend film. The formed TCNQ-PVA material or TCNQ-PVA blend film can be removed from the contained and, if necessary, cut into desired shape and/or size. In some embodiments, the air-drying is performed under a fume hood (i.e., placing the container with the TCNQ-PVA solution under a fume hood), which can provide a relatively fast evaporation speed to affect the phase separation process. Preferably, the fume hood has a face velocity of at least 0.35 m/s during the air-drying. The drying speed can be improved by performing low-temperature heating (e.g., heating at 60° C. or below).

The second triboelectric material layer 104T, in particular the second surface 104TS, is formed by a relatively-tribonegative material (relative with respect to the first triboelectric material of the first triboelectric material layer 102T). In some embodiments, the second triboelectric material layer 104T is formed by a tribo-negative material, such as silicone rubber or polydimethylsiloxane (PDMS).

In some embodiments, the interface provided by the surfaces 102TS, 104TS is a substantially non-adhesion interface with no or negligible chemical bonding between the two surfaces 102TS, 104TS when they are in contact.

The triboelectric generator 100 may further include a first substrate layer attached to the first electrode layer 102E on a side of the first electrode layer 102E opposite to the side connected with the first triboelectric material layer 102T, and a second substrate layer attached to the second electrode layer 104E on a side of the second electrode layer 104E opposite to the side connected with the second triboelectric material layer 104T. The first and second substrate layers may be made of polymers, such as polyethylene terephthalate (PET). The first substrate layer, the first electrode layer 102E, and the first triboelectric material layer 102T may form a first stack (stacked layers). The second substrate layer, the second electrode layer 104E, and the second triboelectric material layer 104T may form a second stack (stacked layers). The first and/or second stacks may be flexible.

In some embodiments, the triboelectric generator 100 includes a mechanism that biases the triboelectric generator 100 in a separated configuration in which the surfaces 102TS, 104TS are spaced apart or separated. A force may be applied, e.g., by a user, to overcome the bias. In some other embodiments, the triboelectric generator 100 includes a mechanism that biases the triboelectric generator 100 in a contact configuration in which the surfaces 102TS, 104TS are in contact. A force may be applied, e.g., by a user, to overcome the bias. In yet some other embodiments, the triboelectric generator 100 includes a mechanism that cause relative motion of the surfaces 102TS, 104TS along a direction substantially perpendicular to the surfaces 102TS, 104TS, to facilitate consecutive contact and separation of the surfaces 102TS, 104TS. The relative motion may be periodic. In yet some other embodiments, the triboelectric generator 100 includes none of these mechanisms.

Figure 2:
FIG. 2 shows a simplified triboelectric series.

FIG. 2 shows a simplified triboelectric series showing various tribo-positive and tribo-negative materials. The following description mainly uses PVA (and TCNQ-modified PVA) and silicone rubber as example of tribo-positive and tribo-negative materials. PVA can be used as a matrix, and it is non-toxic, biocompatible, may have desirable optical properties, and numerous hydroxyl groups suitable for some applications. If PVA and silicone rubber are used as tribo-positive and negative materials respectively, their contacting interface would provide a relatively strong adhesion, making them unsuitable for use as a tribo-material pair for triboelectric generators.

In one embodiment the invention provides a facile solution fabrication process that leverages solvent-evaporation induced phase separation to alter the surface properties of a polymer material, which can be used as a triboelectric material. The polymer material may be modified by organic semiconductor molecules. In one embodiment, PVA is used as polymer material and TCNQ is used as organic semiconductor molecules to modify PVA. TCNQ has a different solubility compared with PVA, is a small organic semiconductor molecule, and can function as a strong electron acceptor owing to its abundant $\pi$ electrons and CN groups. TCNQ is generally insoluble in water at room temperature but can be partially soluble at a higher temperature (e.g., 80° C.) to form a bluish mixture. When TCNQ is mixed with PVA at a higher temperature (e.g., 80° C.), the solubility of TCNQ is enhanced due to the significantly lower surface tension of PVA compared to water, the solubility of TCNQ is enhanced (in PVA vs in water) and a transparent dark greenish TCNQ/PVA blend can be obtained.

Figure 3:
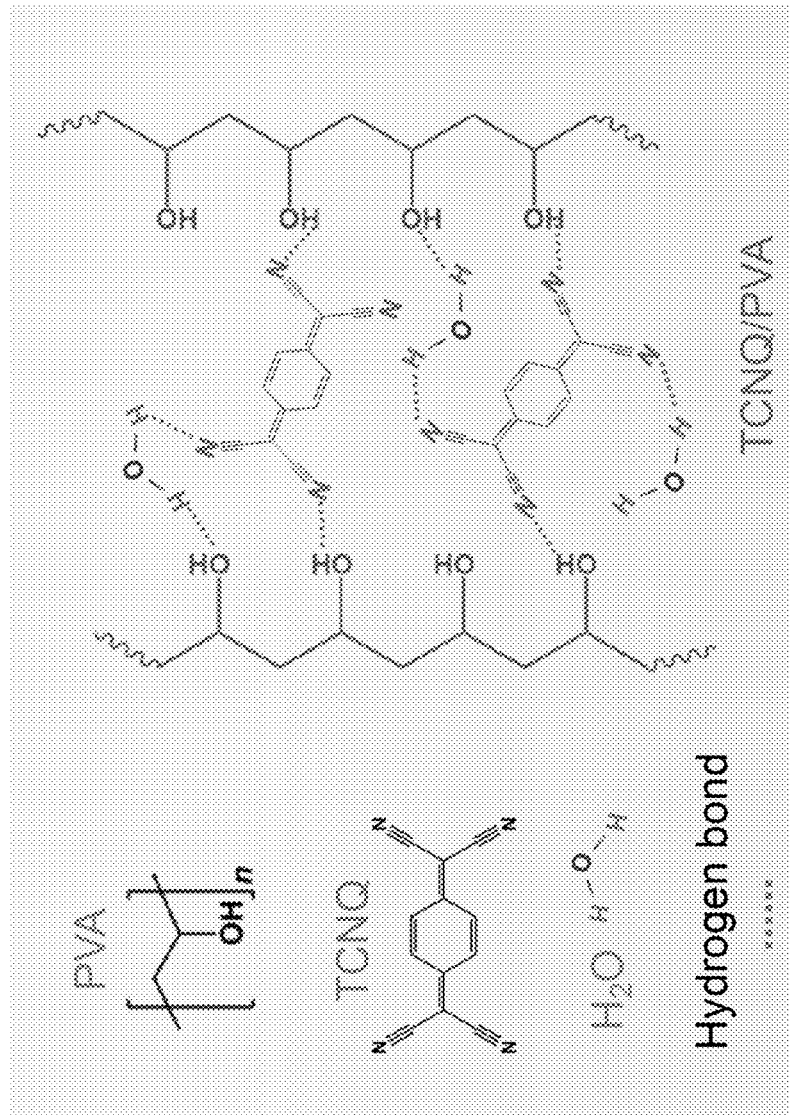
FIG. 3 is a schematic diagram showing molecular structures of PVA, TCNQ, and their interactions in a TCNQ/PVA blend film in one embodiment of the invention.

FIG. 3 shows the molecular structures of PVA, TCNQ, and their interactions in a TCNQ/PVA blend film in one embodiment of the invention. TCNQ, as a hydrogen bond acceptor, tends to form various hydrogen bonding interactions with hydrogen bond donor PVA and water in the polymer blends, thereby forming one mixed phase at a higher temperature (e.g., 80° C.) in solution.

Figure 4:
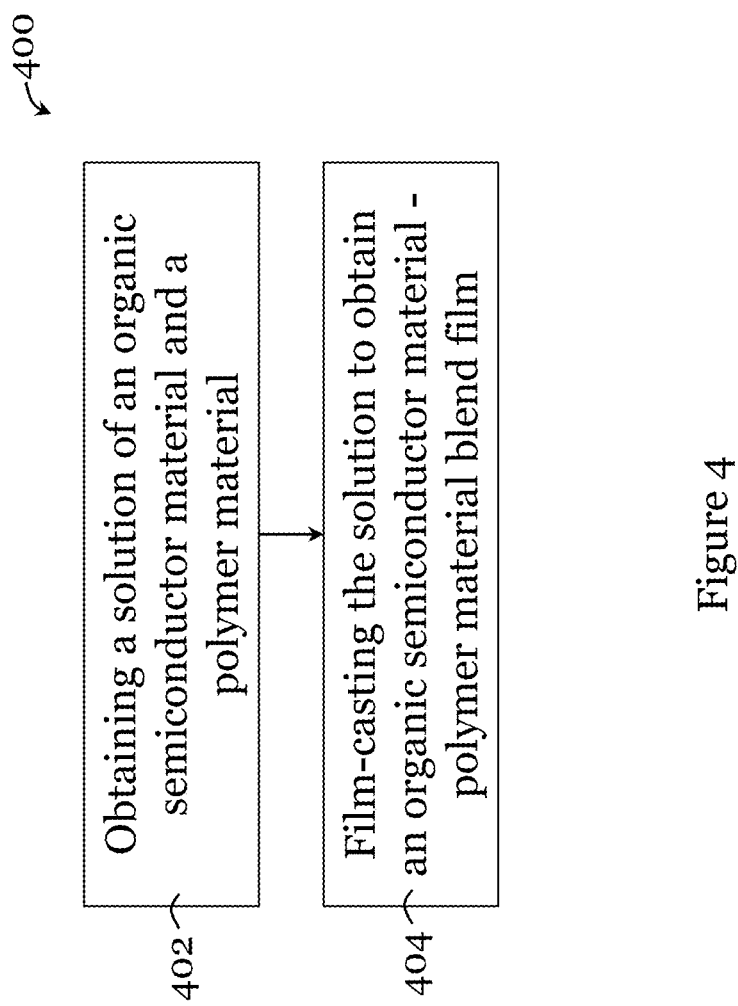
FIG. 4 is a flow chart illustrating a method of making a triboelectric material for a triboelectric generator in one embodiment of the invention.

FIG. 4 illustrates a method 400 of making a triboelectric material for a triboelectric generator in one embodiment of the invention. The method 400 begins in step 402, in which a solution of an organic semiconductor material and a polymer material is obtained. Then, the method 400 proceeds to step 404, in which the solution is film casted to obtain an organic semiconductor material—polymer material blend film, which can be used as a triboelectric material for a triboelectric generator. Without wishing to be bound by theory, the polymer material can be polymer with abundant —OH groups and the organic semiconductor material can be any organic semiconductor material, provided that the following criteria are met: (1) the polymer material (or polymer matrix) has a different solubility than the organic semiconductor material (which facilitates phase change during solvent evaporation); (2) one of the polymer material and the organic semiconductor material acts as a hydrogen bonding donor, another acts as a hydrogen bonding acceptor (desired intermolecular interactions); and (3) the organic semiconductor material, in the form of semiconductor molecules, has coplanar structure, pi-pi stacking, and C≡N functional group (which facilitates formation of surface topography after phase separation).

Figure 5:
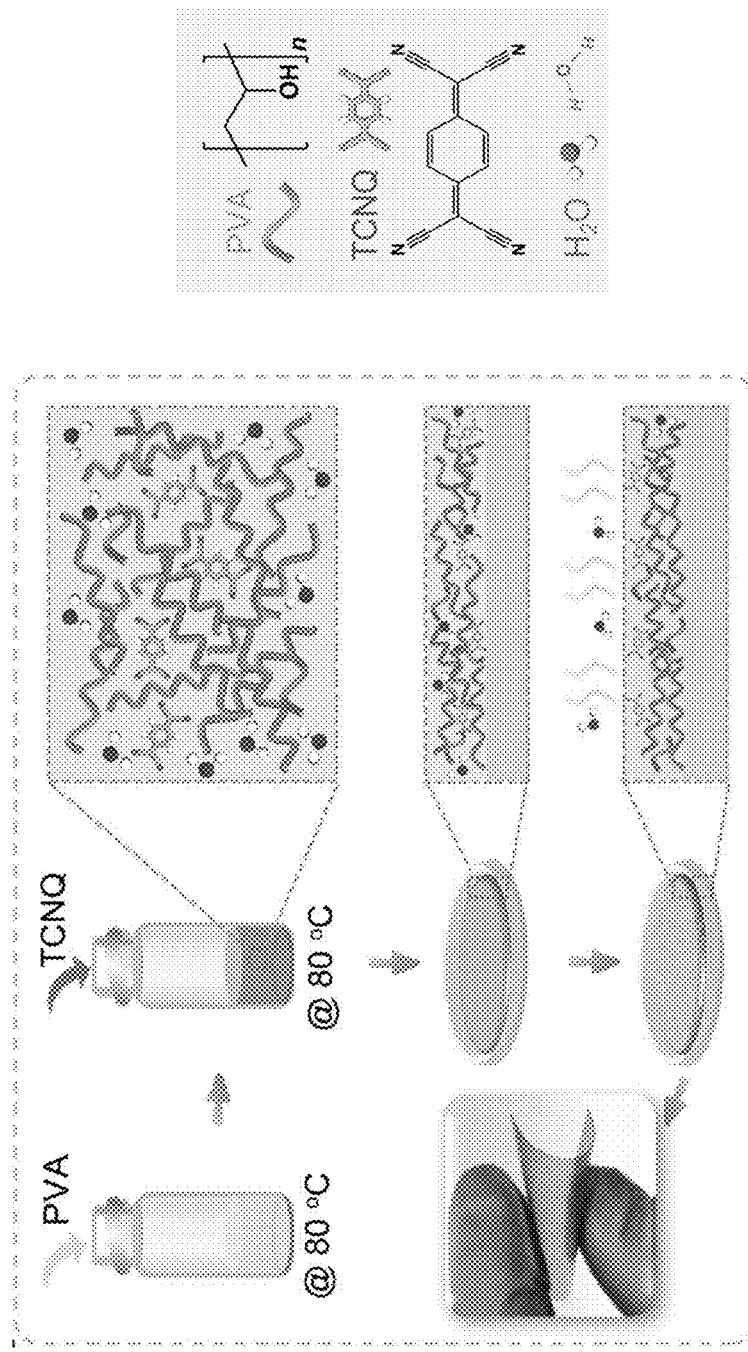
FIG. 5 is a schematic diagram illustrating a method of making a TCNQ/PVA blend film in one embodiment of the invention.

FIG. 5 illustrates the preparation of the TCNQ/PVA blend film, as an exemplary implementation of the method 400 in FIG. 4. In this example of the preparation, a 10% (w/v) PVA (Mowiol® 10-98, molecular weight: ~61,000, Sigma-Aldrich) solution is prepared by dissolving 6 g of PVA in 50 mL of deionized (DI) at 80° C. under vigorous mechanical stirring for 2 hours. Then, X g of 7,7,8,8-tetracyanoquinodimethane (TCNQ, 98%, Sigma-Aldrich) are mixed with 10 mL of 10% (w/v) PVA solution to obtain X % (w/v) of TCNQ/PVA solution, where X is between 0.25-1. The solution is stirred at 80° C. and atmospheric pressure for 1 hour to obtain homogeneous solution. The blends are then casted in plastic petri-dish and dried, or air-dried, under a fume hood operating at a face velocity of 0.35 m/s overnight at room temperature and atmospheric pressure. The resulting film, which is flexible, is peeled off from petri-dish and cut into suitable size. Other volume and/or concentration of PVA may be used in other examples. In the method, when the homogeneous solution is subjected to film-casting, TCNQ with lower solubility tends to solidify first, due the difference in solubilities of PVA and TCNQ, and the interaction parameter $\chi_{23}$ of TCNQ and PVA became stronger along with the decreasing temperature. As a result, TCNQ emerges ahead of (closer to the surface of) the PVA matrix under a certain water evaporation rate, triggering phase separation, resulting in the evolution of surface nano-/microstructures or roughness, which is mainly controlled by the thermodynamic and chemical properties of the homogeneous TCNQ/PVA solution, in particular by Flory-Huggins interactions $\chi_{23}$ associated with temperature change and composition concentrations. The coplanar molecule network of TCNQ is beneficial for the face-to-face $\pi$-$\pi$ stacking, which is useful for stabilizing the phase-separated structure, as evidenced by the change in surface topographies with TCNQ ratio (0.25, 0.5, 0.75, and 1 w/v %).

It should be noted that the above-described chemical volume, ratio, conditions (temperature, pressure, etc.), etc., described with reference to FIG. 5 could be different in other examples. The amount of PVA may be different, e.g., the molecular weight of PVA can be larger than about 60,000, e.g., at about 140,000 to about 190,000. In such case the w/v % of PVA in the preparation may not be 10%. The stirring and/or mixing temperature, pressure, and/or duration may be different. The drying or air-drying temperature, pressure, and/or duration may be different.

TCNQ/PVA blend films with 0.25, 0.5, 0.75, and 1 w/v % TCNQ are prepared in accordance with the above method. A PVA-only film is also prepared in accordance with the above method (but without adding TCNQ). These films are tested and investigated to determine the role of TCNQ and the effect of phase separation on the surface properties, hydrophobicity, and surface morphology/roughness of the TCNQ/PVA blend films.

Figure 6:
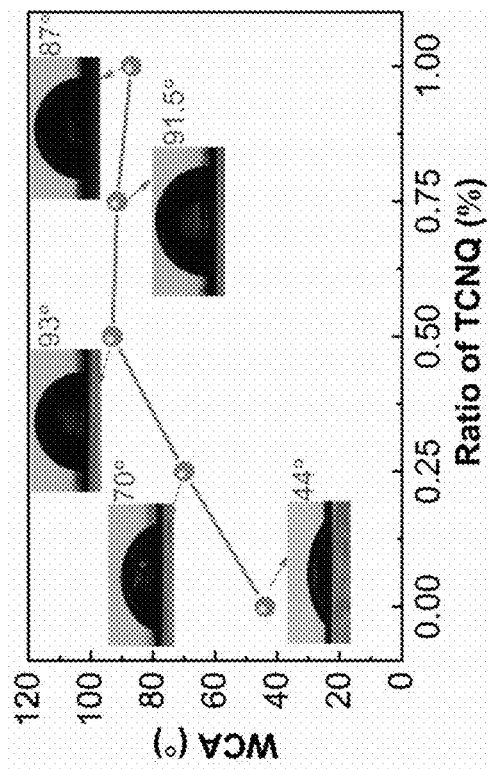
FIG. 6 is a graph illustrating water contact angle of PVA-only film and TCNQ/PVA blend films (with 0.25, 0.5, 0.75, and 1 w/v % TCNQ) in some embodiments of the invention.

FIG. 6 shows water contact angles of the formed PVA-only film and TCNQ/PVA blend films (with 0.25, 0.5, 0.75, and 1 w/v % TCNQ). As shown in FIG. 6, as the dosage of TCNQ increases from 0 w/v % to 0.5 w/v %, the water contact angle increases from 44° to 93°, and as the dosage of TCNQ further increases from 0.5 w/v % to 1 w/v %, water contact angle does not further increase.

Figure 7:
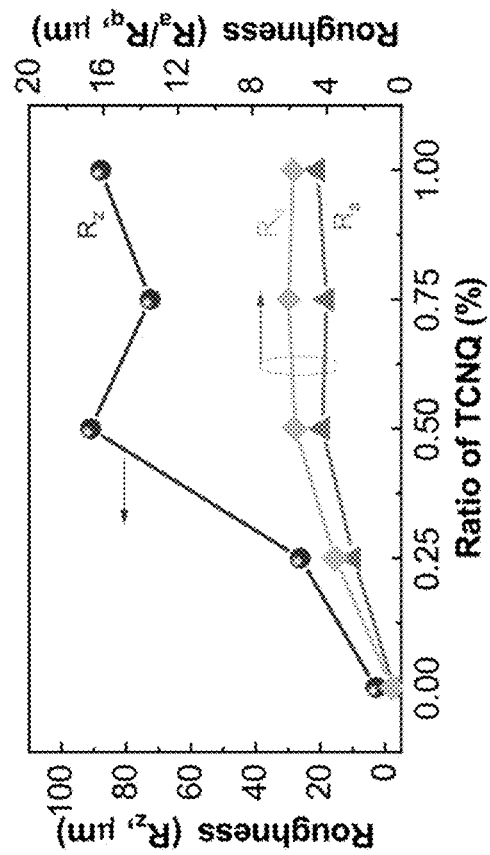
FIG. 7 is a graph illustrating average surface roughness ($R_a$), root-mean-square ($R_q$) roughness, and peak-to-valley ($R_z$) roughness of the PVA-only film and the TCNQ/PVA blend films (with 0.25, 0.5, 0.75, and 1 w/v % TCNQ)

FIG. 7 shows the average surface roughness ($R_a$), root-mean-square ($R_q$) roughness, and peak-to-valley ($R_z$) roughness of the formed PVA-only film and the TCNQ/PVA blend films (with 0.25, 0.5, 0.75, and 1 w/v % TCNQ). As shown in FIG. 7, the TCNQ loading or dosage affects the phase separation process and hence the surface roughness. As shown in FIG. 7, the surface roughness increases when TCNQ increases from 0 w/v % to 1 w/v %, reaching a maximum at 0.5 w/v % TCNQ loading, where the micrometer-scale of $R_z$ is more than ten-fold larger than that of $R_a$ and $R_q$. When TCNQ loading increases from 0.5 w/v % to 1 w/v %, no further increase in roughness is observed. This is in agreement with the water contact angle results.

It has been found that introducing TCNQ in the PVA matrix affects the micrometer-scale roughness and the phase separation-derived morphology, and the intermolecular hydrogen bonding interactions between TCNQ and PVA contributes to the surface topography change in the nanometer-scale.

Figure 8:
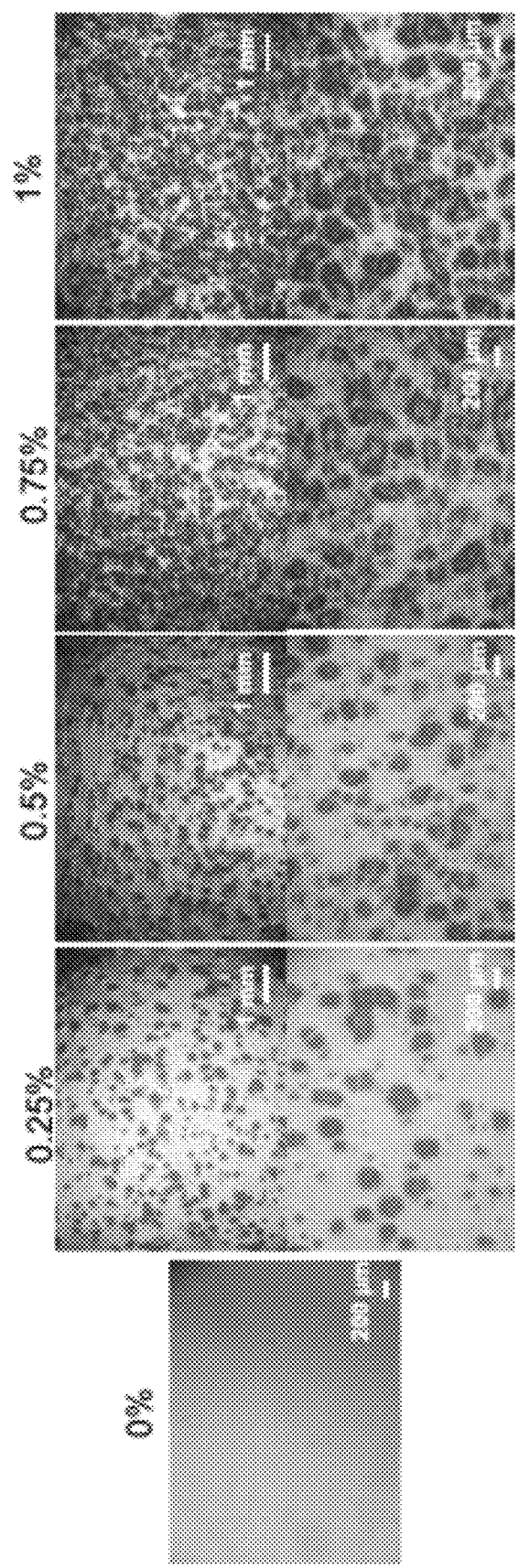
FIG. 8 shows optical microscope images of the TCNQ/PVA blend films (with 0.25, 0.5, 0.75, and 1 w/v % TCNQ) and PVA-only film.

FIG. 8 shows optical microscope images of the TCNQ/PVA blend films (with 0.25, 0.5, 0.75, and 1 w/v % TCNQ) and PVA-only film. It can be seen that surface nano-microstructures are formed on the TCNQ/PVA blend films (with 0.25, 0.5, 0.75, and 1 w/v % TCNQ) but not on the PVA-only film. The density or pattern density of the surface nano-microstructures increases as the amount of TCNQ increases.

Figure 10:
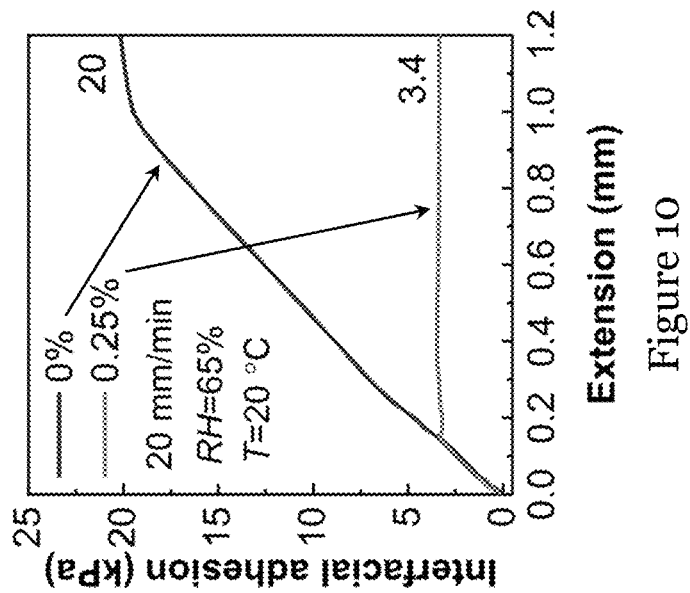
FIG. 10 is a graph showing the interfacial adhesion measured from (i) PVA and silicone rubber and (ii) TCNQ/PVA blend film (0.25 w/v % TCNQ) and silicone rubber using the setup of FIG. 9 at a ramping rate of 20 mm/min under relative humidity (RH) of 65% and 20° C., and no/negligible interfacial adhesion can be measured between TCNQ/PVA blend film (0.5-1 w/v % TCNQ) and silicone rubber.
Figure 9:
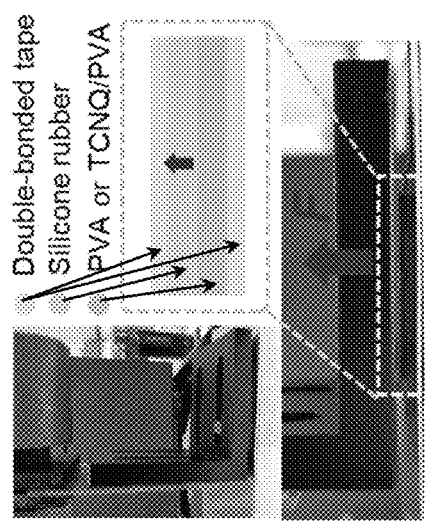
FIG. 9 is a picture showing a setup for quantifying separation force at the interface of two triboelectric materials (PVA and silicone rubber, or, TCNQ/PVA and silicone rubber) of a triboelectric generator and a schematic of the triboelectric generator under test.

FIG. 9 shows a setup constructed using a mechanical tester for quantifying the vertical separation force at the adhesion interface (in this example, 2×2 cm²) of the corresponding surfaces of PVA-silicone rubber and corresponding surfaces of TCNQ/PVA-silicone rubber. The test results, i.e., the interfacial adhesion measure, are shown in FIG. 10. As shown in FIG. 10, at a ramping rate of 20 mm/min under relative humidity (RH) of 65% and 20° C., the maximum interfacial adhesion of the PVA-silicone rubber interface is as about 20 kPa, and the maximum interfacial adhesion of the TCNQ/PVA (0.25 w/v % of TCNQ)-silicone rubber interface is about 3.4 kPa. By further increasing the TCNQ loading in TCNQ/PVA blend film, non-adhesion interfaces with even less or substantially zero interfacial adhesion can be measured.

Figure 11:
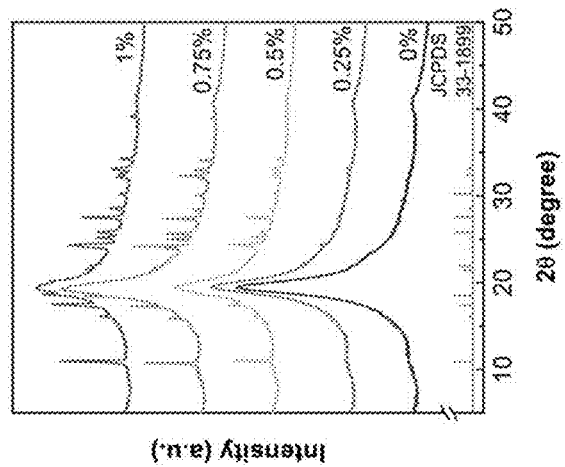
FIG. 11 is a graph showing X-ray diffraction (XRD) patterns of the PVA-only film and the TCNQ/PVA blend films (with 0.25, 0.5, 0.75, and 1 w/v % TCNQ)

FIG. 11 shows X-ray diffraction (XRD) patterns of the PVA film and the TCNQ/PVA blend films (with 0.25, 0.5, 0.75, and 1 w/v % TCNQ). By increasing the loading of TCNQ in TCNQ/PVA blend films, the intensity of diffraction peaks of TCNQ (JCPDS 33-1899) gradually increases, while the intensity of the characteristic peak of PVA at ~19.6° corresponding to (101) crystalline phase decreases, which suggests that TCNQ affects the crystallinity of PVA. The decline in crystallinity with increasing TCNQ indicates the intermolecular interaction between TCNQ and PVA affects the packing of PVA chains.

Figure 12:
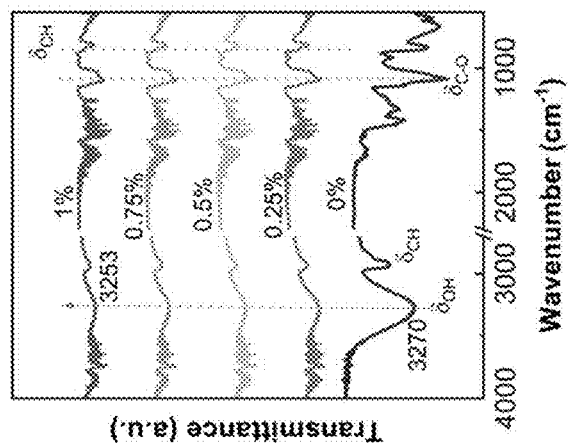
FIG. 12 is a graph showing attenuated total reflectance Fourier transform infrared (ATR-FTIR) spectra of the PVA-only film and the TCNQ/PVA blend films (with 0.25, 0.5, 0.75, and 1 w/v % TCNQ)

FIG. 12 shows attenuated total reflectance Fourier transform infrared (ATR-FTIR) spectra of the PVA-only film and the TCNQ/PVA blend films (with 0.25, 0.5, 0.75, and 1 w/v % TCNQ), which reveals the intermolecular interactions in the TCNQ/PVA blend films. Attributed to strong electron withdrawing capability of C≡N groups of TCNQ, the —OH bands of PVA shifts from 3270 to 3253 cm$^{-1}$ with increasing load of TCNQ, which is due to formation of hydrogen bonds (—C≡N . . . H—O complex) between hydroxyl and cyanide groups. The decrease in intensity of —OH bands, C—H bands (2910-2935 cm$^{-1}$), and C—O bands (1089 cm$^{-1}$) further verifies the strong interactions between PVA and TCNQ. While the C—H stretching bands at 860 cm$^{-1}$ belong to TCNQ, the characteristic C≡N stretching bands at 2138-2192 could not be observed, which confirms the hydrogen bonds between C≡N and —OH.

The molecular interactions between TCNQ and PVA in the TCNQ/PVA blend films in turn affects the mechanical and thermal properties of the blend films.

Figure 13:
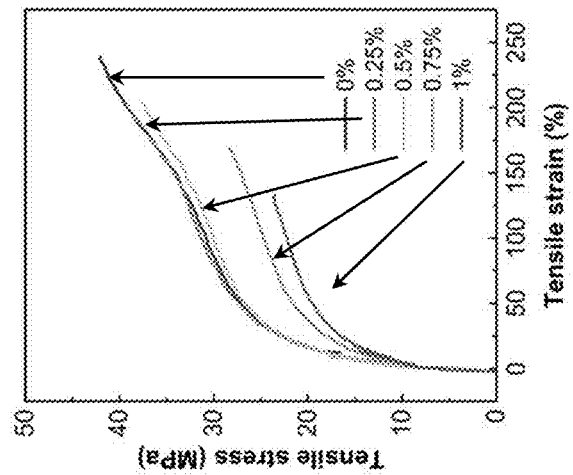
FIG. 13 is a graph showing stress-strain curves of the PVA-only film and the TCNQ/PVA blend films (with 0.25, 0.5, 0.75, and 1 w/v % TCNQ)

FIG. 13 shows the tensile stress-strain curves of the PVA-only film and the TCNQ/PVA blend films (with 0.25, 0.5, 0.75, and 1 w/v % TCNQ). The elongation at break of PVA (o %) is 240% and decreases as TCNQ loading increases, to 200%, 170%, and 133% for 0.25% and 0.5 w/v %, 0.75 w/v %, and 1 w/v % TCNQ/PVA blend films, respectively.

Figure 14:
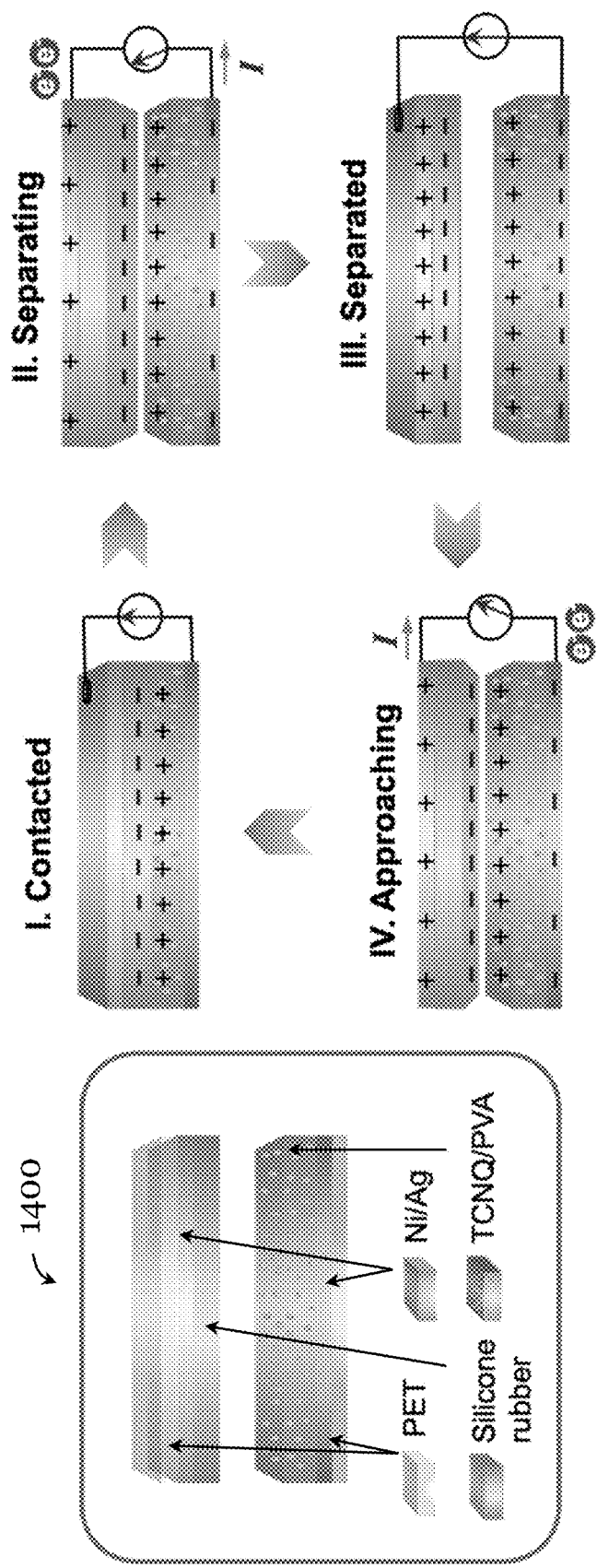
FIG. 14 is a schematic diagram illustrating an operation mechanism of a triboelectric generator in one embodiment of the invention.

FIG. 14 shows a triboelectric generator 1400 in one embodiment of the invention and its operation principle. The triboelectric generator 1400 includes a TCNQ/PVA blend film (0.5 w/v % TCNQ) as the tribo-positive material, silicone rubber as the tribo-negative material, Ni/Ag conductive tapes as the top and bottom electrodes attached to the TCNQ/PVA blend film and the silicone rubber respectively, and PET substrate attached to the Ni/Ag conductive tapes. In operation of the triboelectric generator 1400, when TCNQ/PVA and silicone rubber are brought into contact, surface charges are generated at the interface due to the contact electrification, leaving positively charged TCNQ/PVA and negatively charged silicone rubber (state I). Benefiting from the adhesion-free interface, no extra work is needed to separate the two surfaces. Owing to the electrostatic induction, opposite charges induced at the electrodes drive electrons flow through the external circuit, generating a negative current signal (state II), until an equilibrium state is established when the two surfaces are fully separated (state III). Once the surfaces approach each other again under external stimuli, electrons on the electrodes flow in an opposite direction to reach a new equilibrium so as to generate a positive current (state IV). Alternating current (AC) signals are thus generated upon continuous (e.g., periodic) contact and separation.

A triboelectric generator is fabricated based on the design of the triboelectric generator 1400, with TCNQ/PVA blend film (0.5 w/v % TCNQ) and a size (surface area) of 3×3 cm$^2$. In this prototype, the TCNQ/PVA material film and the silicone rubber layer (and the electrodes and substrates) have with dimension of 3×3 cm$^2$. The TCNQ/PVA material film has an average thickness of ~150 μm. The silicon rubber layer has a thickness of ~180 μm. Double-sided conductive Ni/Ag tape are used as the electrodes, and polyethylene terephthalate (PET) (200 μm) is used as the substrate layers. The various tests below are performed on this triboelectric generator prototype (3×3 cm$^2$, with TCNQ/PVA blend film (0.5 w/v % TCNQ)) unless otherwise specified.

Figure 15:
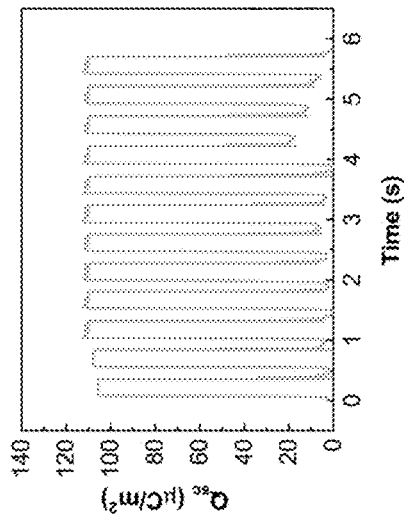
FIG. 15 is a graph showing measured open-circuit voltage $V_{oc}$ when the triboelectric generator (TCNQ/PVA blend film with 0.5 w/v % TCNQ) of FIG. 14 operates under input force of ~5 N at frequency of 2 Hz.
Figure 16:
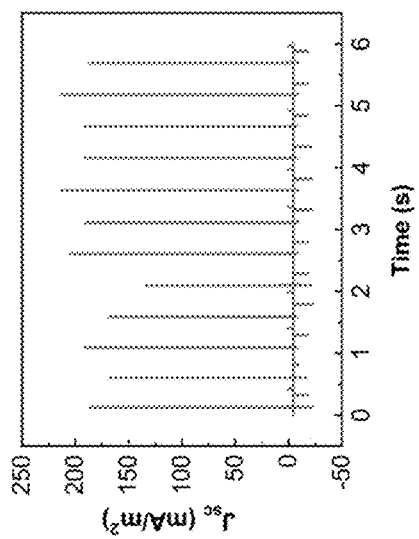
FIG. 16 is a graph showing measured short-circuit current density $J_{sc}$ when the triboelectric generator (TCNQ/PVA blend film with 0.5 w/v % TCNQ) of FIG. 14 operates under input force of ~5 N at frequency of 2 Hz.
Figure 17:
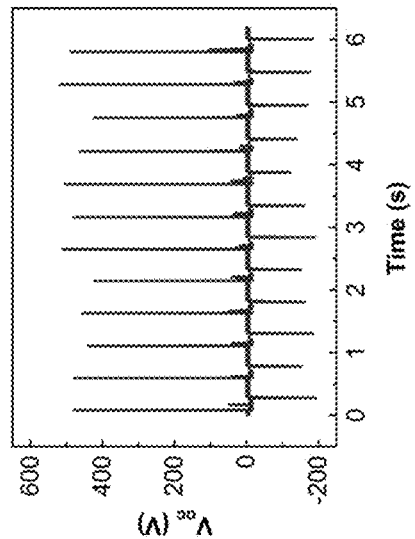
FIG. 17 is a graph showing measured short-circuit charge density $Q_{sc}$ when the triboelectric generator (TCNQ/PVA blend film with 0.5 w/v % TCNQ) of FIG. 14 operates under input force of ~5 N at frequency of 2 Hz.

Tests are performed to determine the output characteristics (open-circuit voltage $V_{oc}$, short-circuit current density $J_{sc}$, and short-circuit charge density $Q_{sc}$) of the fabricated triboelectric generator. The tests are carried out under input force of ~5 N at a frequency of 2 Hz. The test results are shown in FIGS. 15-17. It is found that the device can generate an open-circuit voltage ($V_{oc}$) of 520 V, short-circuit current density ($J_{sc}$) of 218 mA/m$^2$, and short-circuit charge density ($Q_{sc}$) of 110 μC/m$^2$.

Although not specifically illustrated, it has also been found that the magnitude of the open-circuit voltage $V_{oc}$ and of the short-circuit current density $J_{sc}$ are generally proportional to the device size (obtained by comparing triboelectric generator (TCNQ/PVA blend film with 0.5 w/v % TCNQ) of different sizes (1×1, 2×2, 3×3, and 4×4 cm$^2$)).

Figure 18:
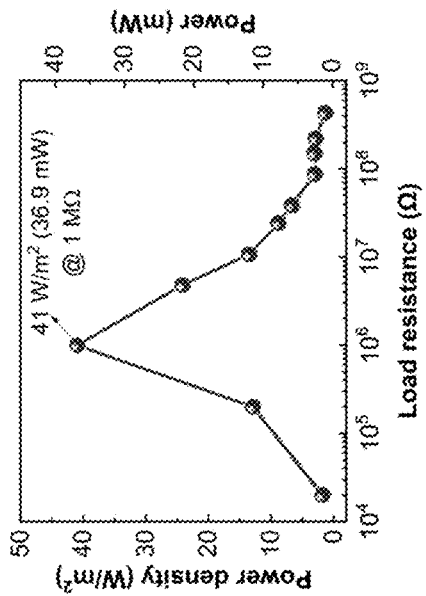
FIG. 18 is a graph showing output voltage and current density of the triboelectric generator (TCNQ/PVA blend film with 0.5 w/v % TCNQ) of FIG. 14 at different external load resistances.
Figure 19:
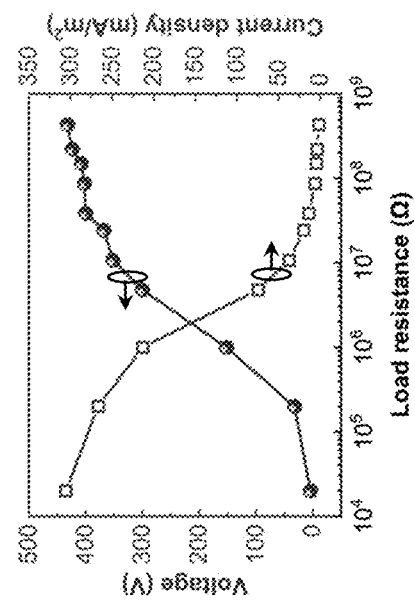
FIG. 19 is a graph showing instantaneous peak power density and power of the triboelectric generator (TCNQ/PVA blend film with 0.5 w/v % TCNQ) of FIG. 14 at different external load resistances.

FIGS. 18 and 19 show output voltage and current density, and instantaneous peak power (density) of the triboelectric generator (TCNQ/PVA blend film with 0.5 w/v % TCNQ) at different external load resistances. As shown in FIG. 18, with increasing load resistance from 20 kΩ to 342 MΩ, the output voltage of triboelectric generator gradually increases, while the current density gradually decreases. As shown in FIG. 19, the maximum instantaneous peak power density calculated by P=I$^2$R/area can reach as high as 41 W/m$^2$ (equivalent to 36.9 mW) at a load resistance of 1 MΩ.

Figure 20:
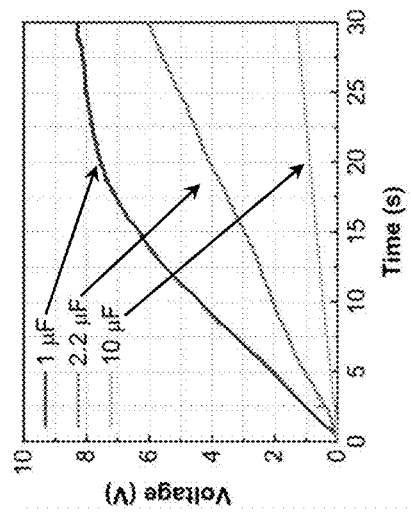
FIG. 20 is a graph showing average power density of the triboelectric generator (TCNQ/PVA blend film with 0.5 w/v % TCNQ) of FIG. 14 at different external load resistances.

FIG. 20 shows the average power density of the triboelectric generator (TCNQ/PVA blend film with 0.5 w/v % TCNQ) at different external load resistances. As shown in FIG. 20, as the load resistance increases from the order of kΩ to MΩ, the average power density (mW m$^{-2}$ Hz$^{-1}$) generally increases, peaks at 19.4 mW m$^{-2}$ Hz$^{-1}$ at a load resistance of 1 MΩ.

Figure 21:
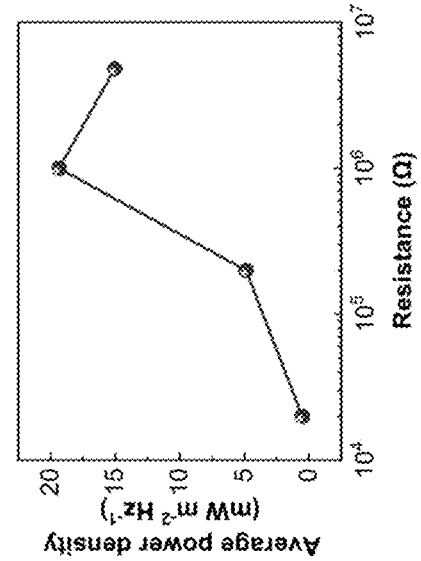
FIG. 21 is a graph showing charging of capacitors (1, 2.2, and 10 μF) using the triboelectric generator (TCNQ/PVA blend film with 0.5 w/v % TCNQ) of FIG. 14.

FIG. 21 shows charging of capacitors (1, 2.2, and 10 μF) using the triboelectric generator (TCNQ/PVA blend film with 0.5 w/v % TCNQ). By using triboelectric generator to continuously charge capacitors for only 30 s, capacitors of 1, 2.2, and 10 μF can reach 8.3, 6.0, and 1.3 V, respectively, with corresponding stored energy of 34.4, 39.6, and 8.45 μJ, respectively.

Figure 22:
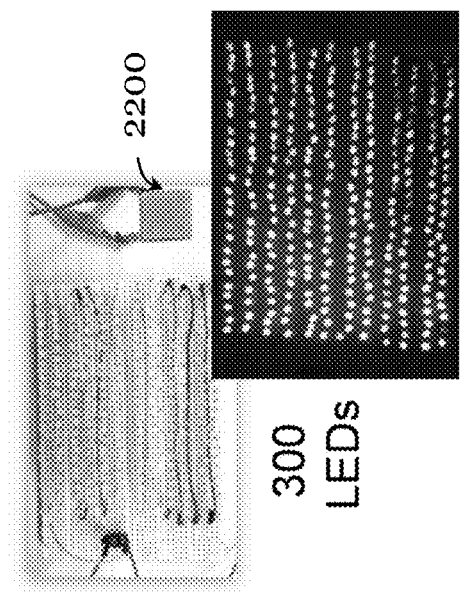
FIG. 22 is a diagram illustrating an exemplary application of a triboelectric generator in one embodiment of the invention for lighting up LEDs.

FIG. 22 illustrates an application of the triboelectric generator 2200 (3×3 cm$^2$, TCNQ/PVA blend film with 0.5 w/v % TCNQ and silicone rubber) for lighting up LEDs. As shown in FIG. 22, 300 green LEDs (rated 0.06 W each) in serial connection are successfully lit up by manually tapping the triboelectric generator 2200 (to consecutively separate and contact the tribo-positive TCNQ/PVA layer and the tribo-negative silicone rubber layer).

Figure 23A:
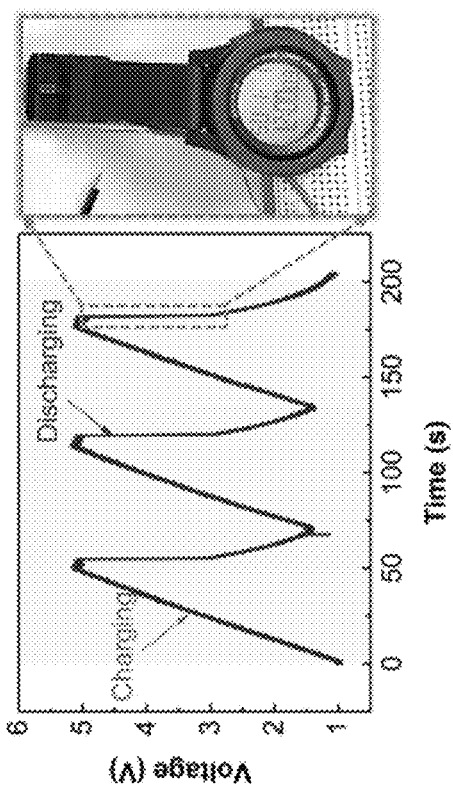
FIG. 23A is a diagram illustrating an exemplary application of a triboelectric generator in one embodiment of the invention for powering an electronic watch.

FIG. 23A illustrates applications of the triboelectric generator (3×3 cm$^2$, TCNQ/PVA blend film with 0.5 w/v % TCNQ and silicone rubber) for powering an electronic watch (e-watch) through charging a 10-μF capacitor by manually tapping the triboelectric generator with a small force of 1~2 N and a low frequency of 4 Hz. The voltage changes across the capacitor after three charging/discharging cycles of the e-watch and its snapshot at fully charged state are shown in FIG. 23A. With the capacitor charged to 5 V, the e-watch can sustain operation for 6 s.

Figure 23C:
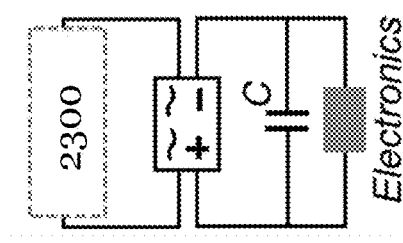
FIG. 23C is a simplified circuit diagram illustrating the circuit connection in the application of FIGS. 23A and 23B.
Figure 23B:
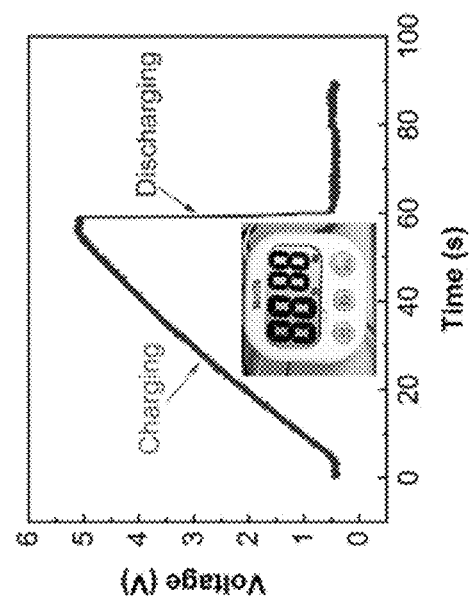
FIG. 23B is a diagram illustrating an exemplary application of a triboelectric generator in one embodiment of the invention for powering a timer.

FIG. 23B illustrates applications of the triboelectric generator (3×3 cm$^2$, TCNQ/PVA blend film with 0.5 w/v % TCNQ and silicone rubber) for powering a timer through charging a 10-μF capacitor by manually tapping the triboelectric generator with a small force of 1~2 N and a low frequency of 4 Hz, and FIG. 23C shows the corresponding simplified circuit diagram for FIGS. 23A and 23B.

Figure 24B:
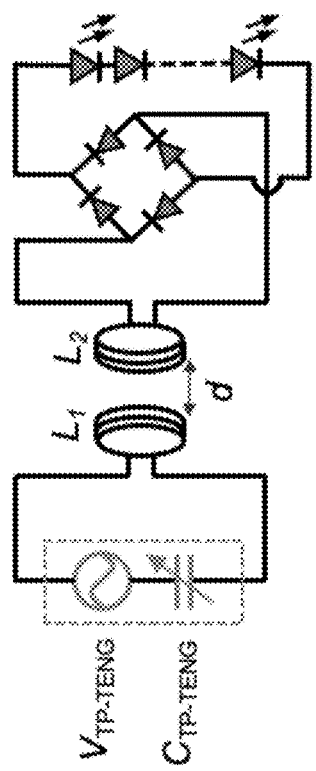
FIG. 24B is a simplified circuit diagram illustrating the circuit connection in the application of FIG. 24A.
Figure 24A:
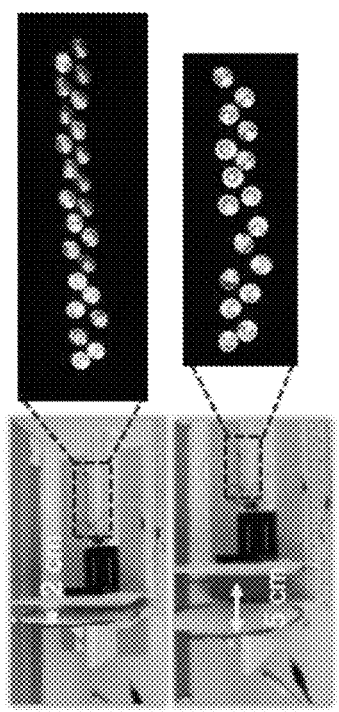
FIG. 24A is a diagram illustrating an exemplary application of a triboelectric generator in one embodiment of the invention for wirelessly powering LEDs.

FIG. 24A illustrates applications of the triboelectric generator (3×3 cm$^2$, TCNQ/PVA blend film with 0.5 w/v % TCNQ and silicone rubber) for wirelessly powering LEDs, and FIG. 24B shows the corresponding simplified circuit diagram. As illustrated in FIG. 24A, the triboelectric generator can wirelessly lit up LEDs using a power transmission circuit with two inductor coils arranged at a distance d (inductance $L_1=L_2$=35 pH, 10 turns, diameter of 14 cm). 24-serially-connected green LEDs can be wirelessly lit up at a transmission distance d of 2 cm and 17-serially-connected green LEDs can be wirelessly lit up at a transmission distance d of 5 cm.

Significantly, the applications in FIGS. 22 to 24B demonstrate that the triboelectric generator can serve as a biomechanical energy harvester, and may be an effective and high-performance wearable power source for wearable electronics by harvesting biomechanical energy.

The embodiments of the invention have provided a blend film comprising a low dosage (less than 5 w/v %, preferably less than 1 w/v %) of organic semiconductor molecules and a water-soluble polymer matrix, which can be fabricated through a facile and scalable solution process. By optimizing the amount of organic semiconductor molecules in the polymer matrix, a triboelectric material with desirable interfacial properties can be obtained.

The intermolecular hydrogen bonding interactions and nano/micro meter-scale surface roughness induced by phase separation in the fabrication method enables formation of a triboelectric material, or surface, that can interact with another triboelectric surface of different material, to form a substantially non-adhesion interface therebetween, to provide a corresponding triboelectric generator. Such triboelectric generator may supply sufficient power to drive small electronics, hence is a promising power source for wearable electronics. In some embodiments, the non-adhesion interface is resultant from intermolecular hydrogen bonding interactions and solvent-evaporation induced phase separation in the making process. The phase separation between the organic semiconductor and polymer matrix can induce nano/micrometer surface roughness, generating a microscale convex pattern topography, with increasing pattern density along with increasing loading of the organic semiconductor. The embedded organic semiconductor can change the hydrophilicity of the polymer matrix.

The triboelectric generator of the present invention can be used as an energy harvester, in particular a biomechanical energy harvester, arranged to harvest daily human motions, such as jogging, running, and exercising. The harvested energy can be used to drive personal electronics so as to realize self-powered wearable electronics (e.g., without other power source). The triboelectric generator can be used as a wearable power source for powering various sensors for human healthcare monitoring, such as heart rate, blood pressure, breath analysis, and various other applications.

It will be appreciated by persons skilled in the art that numerous variations and/or modifications may be made to the invention as shown in the specific embodiments to provide other embodiments of the invention. Various (non-exhaustive) exemplary variations are set forth in the summary. The described embodiments of the invention should be considered in all respects as illustrative, not restrictive.

The invention claimed is:

1. A triboelectric generator comprising:
   a first triboelectric material providing a first surface;
   a first electrode attached to the first triboelectric material;
   a second triboelectric material different from the first triboelectric material and providing a second surface for contacting the first surface;
   a second electrode attached to the second triboelectric material; and
   wherein the first electrode and the second electrode are arranged to be electrically connected via an electrical connection; and
   wherein the first triboelectric material comprises a polymer material and an organic semiconductor material arranged in the polymer material.

2. The triboelectric generator of claim 1, wherein the first surface and the second surface define a substantially non-adhesion interface.

3. The triboelectric generator of claim 1, wherein the organic semiconductor material comprises TCNQ.

4. The triboelectric generator of claim 3, wherein the polymer material comprises PVA.

5. The triboelectric generator of claim 1, wherein the first triboelectric material comprises a TCNQ-PVA material and the first surface comprises a TCNQ-modified PVA surface.

6. The triboelectric generator of claim 5, wherein the first surface and the second surface define a substantially non-adhesion interface.

7. The triboelectric generator of claim 5, wherein the second triboelectric material comprises a tribo-negative material.

8. The triboelectric generator of claim 7, wherein the second triboelectric material comprises silicone rubber.

9. The triboelectric generator of claim 5, wherein the TCNQ-PVA material comprises a TCNQ-PVA blend film.

10. The triboelectric generator of claim 5, wherein the TCNQ-PVA material comprises, at least, a first part with a higher concentration of TCNQ and a second part with a lower concentration of TCNQ; and
    wherein the first part includes the TCNQ-modified PVA surface.

11. The triboelectric generator of claim 5, wherein the TCNQ-modified PVA surface is a patterned or roughened surface with nano-meter scale surface roughness; or wherein the TCNQ-modified PVA surface is a patterned or roughened surface with micro-meter scale surface roughness.

12. The triboelectric generator of claim 1, further comprising:
    a first substrate attached to the first electrode such that the first electrode is disposed between the first substrate and the first triboelectric material; and
    a second substrate attached to the second electrode such that the second electrode is disposed between the second substrate and the second triboelectric material.

13. The triboelectric generator of claim 1, wherein the triboelectric generator is a contact-separation triboelectric generator.

14. The triboelectric generator of claim 1, wherein the triboelectric generator is a flexible triboelectric generator.

15. A biomechanical energy harvester comprising the triboelectric generator of claim 1.

16. A method of making a triboelectric material for a triboelectric generator, the method comprising:
    obtaining a solution of an organic semiconductor material and a polymer material; and
    facilitating phase separation of the solution to obtain the polymer material and the organic semiconductor material arranged in the polymer material as an organic semiconductor material—polymer material blend film, the organic semiconductor material—polymer material blend film being the triboelectric material.

17. The method of claim 16, wherein the solution is a TCNQ-PVA solution, the organic semiconductor material—polymer material blend film is a TCNQ-PVA blend film, and the TCNQ-PVA blend film is arranged to provide a tribo-positive surface.

18. The method of claim 17, wherein the TCNQ-PVA solution contains 0.25 w/v % to 1 w/v %, preferably 0.5 w/v % to 1 w/v %, TCNQ.

19. The method of claim 17, wherein obtaining the TCNQ-PVA solution comprises:
    mixing TCNQ with a PVA solution to obtain a homogeneous TCNQ-PVA solution.

20. The method of claim 19, further comprising:
    heating the TCNQ and PVA solution during at least part of the mixing.

* * * * *